Feb. 21, 1933.  F. H. JOHNSON  1,898,013
PYROMETER GAUGE
Filed May 1, 1931
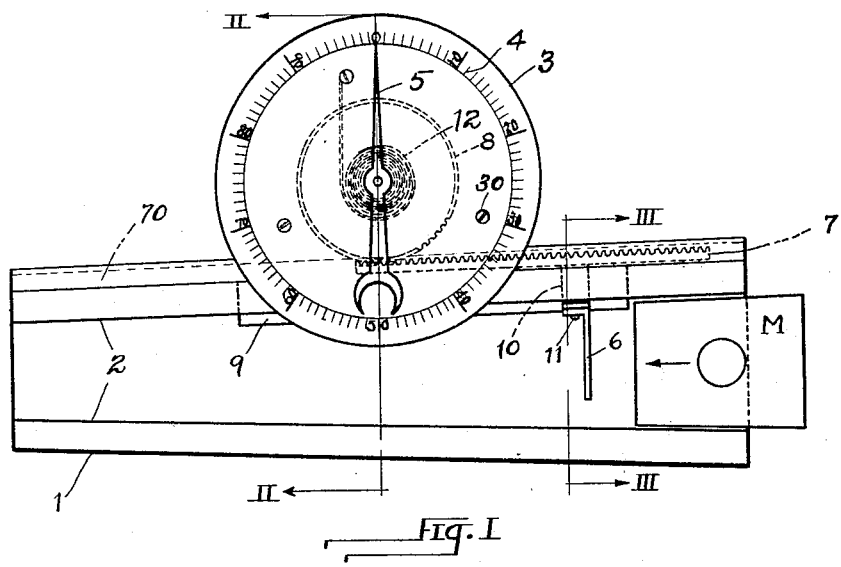
Fig. I
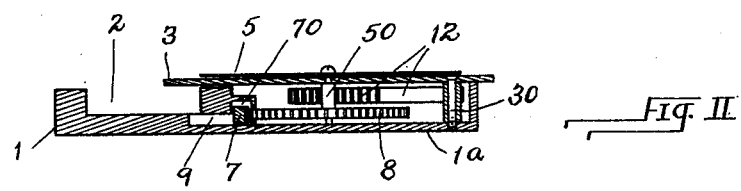
Fig. II
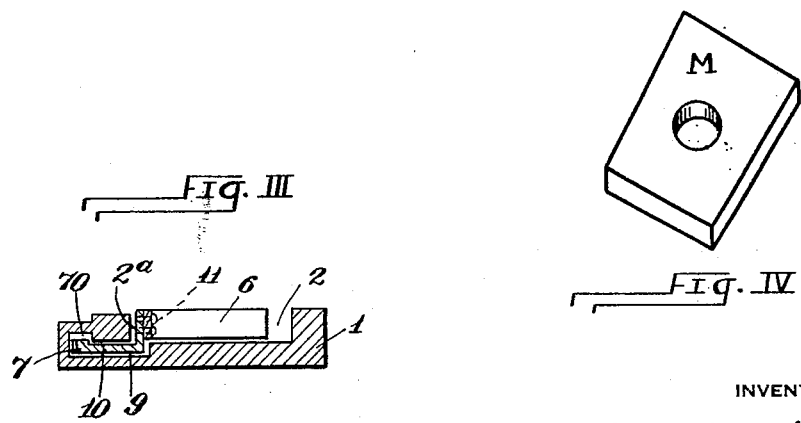
Fig. III
Fig. IV
INVENTOR
Frederick H. Johnson
by Christy, Christy and Wharton
his attorneys Patented Feb. 21, 1933

1,898,013

UNITED STATES PATENT OFFICE

FREDERICK H. JOHNSON, OF SUMMITVILLE, OHIO

PYROMETER GAUGE

Application filed May 1, 1931. Serial No. 534,207.

This invention relates to a pyrometer, a pyrometer particularly adapted for use in the manufacture of pottery. For years it has been recognized by potters that the most practical and effective manner of studying the thermal conditions of a kiln is with test pieces. These test pieces are bodies of standard size and shape; they are composed of material having characteristics similar to the products which are to be fired in the kiln. In the parlance of the art these test pieces are known as trial masses, or trial pieces.

By careful observation of the condition of trial masses at various points within the kiln, the attendant may keep accurate check on the temperature of the kiln and may ascertain the condition of the ceramic bodies being fired. Consequently, the attendant, in understanding the exact conditions within the kiln, can appropriately regulate the firing of the kiln. The manner in which trial masses are placed within a kiln is well known; the manner in which they are withdrawn from the kiln from time to time and studied is a matter of common knowledge; and a detailed explanation of such procedure is not necessary to an understanding of my invention. Suffice to say that trial masses are (ordinarily) flat bodies having tapering sides; the taper of the sides and the other dimensional characteristics of the trial masses are standardized, so that, after they have remained under the influence of the kiln for sufficient time, they may be withdrawn and their expansion or shrinkage accurately gauged. Pyrometer gauges are used to this end.

A pyrometer gauge comprises a body having an elongate groove which tapers in correspondence with the tapering sides of the standardized trial masses; the groove provides a seat for the trial mass, and, to obtain a gauging of the mass, the mass is slid longitudinally into the groove, until its sides bind against the walls of the groove. The position of the trial mass, when it is wedged in the groove, is indicative of its size, and the walls of the groove, in being provided with graduations in convenient units, will appropriately indicate the deviation of the trial mass from its initial dimensions, that is from its dimensions at room temperature. While a gauge having graduations on or adjacent the side walls of its groove has proven of value to the art, I find that its structure may be improved, to the end that the measurement of a trial mass can be more quickly and more precisely determined.

My improved gauge is illustrated in the accompanying drawing, in which Fig. I is a view of the instrument in plan from above; Fig. II and Fig. III are views in cross section, taken, respectively, on the planes II—II and III—III of Fig. I; and Fig. IV is an isometric view of a typical trial mass.

The gauge comprises a body 1 having an elongate, symmetrically-tapering groove 2 formed therein. It is into this groove that a trial mass (M) is slid, as indicated by the arrow in Fig. I, and, according as the mass wedges in the groove to one side or the other of the position which it would occupy at normal temperature, its expansion or contraction will be indicated. For present purposes I shall denote such position (the position which the trial mass under normal conditions of temperature, say room temperature, occupies in the groove) as the "zero" position. It is with means for accurately evaluating in suitable units of measurement the deviation from the "zero" position which exists when a trial mass is removed from the kiln and wedged in the groove. In this manner the variations in size of several trial masses may be observed, whereupon the thermal condition of the kiln may be deduced.

Advantageously, such means include a dial face 3 provided with graduations 4 which are calibrated in desired units of measurement. An index 5 is secured to a revoluble post 50, to swing over the face of dial 3, and a mechanical linkage connects the dial with a member 6, which member extends into groove 2 and is movable along the groove when the trial mass abuts it and is slid toward the above-mentioned wedged position. Effective means for transmitting the movement of member 6 to index 5 comprise a toothed rack 7, meshing with a gear 8 secured to the index post 50. The rack 7 is slidable in a way 70, along the side of body 1; the body 1 is undercut or slotted at 9; and arm 10 is secured to the rack, and extends transversely of the slot 9 and up the face 2a of the groove 2; and member 6 is affixed, conveniently by screws 11, to the arm 10. Manifestly, movement of the trial mass M into the groove 2 will effect with calibrated movement the swinging of index 5. Desirably, resilient means are organized in such manner as to tend to maintain the member 6 at the right-hand end (Fig. I) of slot 9. I show a spiral spring 12 so organized, but for purposes of illustration the member 6 is not shown at the right-hand end of slot 9; it is at the "zero" position—the position where the trial mass would place it, if the trial mass, at normal temperature, were wedged into the groove 2. The body 1 may, as indeed it does, include a portion 1a for the housing of the index-moving mechanism, and the dial 3 is secured to such housing by means of screws 30.

So, it will be understood that either expansion or contraction of the trial mass may be readily determined, and determined with precision, in a device embodying my invention.

I claim as my invention:

1. In a trial-mass pyrometer, the combination of a body provided with an elongate, tapering groove, forming with the remainder of said body a seat of a trial-mass, a graduated dial face, an index movable over said graduated face, a movable member extending transversely of and into said groove, a rack secured at an angle to said movable member, and a spring-backed gear in mesh with said rack, whereby a trial-mass, when shoved in seated position along said groove, effects a shifting of said movable member and a turning of said index.

2. In a trial-mass pyrometer, the combination of a body provided with an elongate, tapering groove, forming with the remainder of said body a seat for a trial-mass, a graduated dial face, an index movable over said graduated face, a movable member extending transversely of and into said groove, a rack secured at an angle to said movable member, and a gear connected to said index and in mesh with said rack, whereby a trial-mass, when shoved in seated position along said groove, effects a shifting of said movable member and rack and a turning of said index.

3. In a trial-mass pyrometer, the combination of a body provided with an elongate, tapering groove, forming with the remainder of said body a seat for a trial-mass, a graduated dial face, an index movable over said graduated face, the wall of said groove including a slot extending longitudinally thereof, a movable member projecting through said slot and extending transversely of said groove, a rack secured to said movable member without said groove, and a gear associated with said index and in mesh with said rack, whereby a trial-mass, when shoved along said groove, effects a shifting of said movable member and rack and a turning of said index.

In testimony whereof I have hereunto set my hand.

FREDERICK H. JOHNSON.